United States Patent
Nobuto et al.

(10) Patent No.: US 7,091,139 B2
(45) Date of Patent: Aug. 15, 2006

(54) FLAME-RETARDANT LEATHER-LIKE SHEET SUBSTRATE AND PRODUCTION METHOD THEREOF

(75) Inventors: Yoshiki Nobuto, Okayama (JP); Yoshiaki Yasuda, Okayama (JP); Yoshihiro Tanba, Okayama (JP)

(73) Assignee: KURARAY Co., Ltd., Kurashiki (JP)

( * ) Notice: Subject to any disclaimer, the term of this patent is extended or adjusted under 35 U.S.C. 154(b) by 56 days.

(21) Appl. No.: 10/454,499

(22) Filed: Jun. 5, 2003

(65) Prior Publication Data
US 2003/0232555 A1 Dec. 18, 2003

(30) Foreign Application Priority Data
Jun. 12, 2002 (JP) ............................ 2002-171264
Sep. 20, 2002 (JP) ............................ 2002-275082

(51) Int. Cl.
*B32B 9/00* (2006.01)
(52) U.S. Cl. ..................... 442/136; 442/381; 428/904
(58) Field of Classification Search ................ 442/340, 442/341, 351, 381, 392, 414, 136; 428/904
See application file for complete search history.

(56) References Cited

U.S. PATENT DOCUMENTS

| | | | | |
|---|---|---|---|---|
| 4,426,421 A | * | 1/1984 | Nakamae et al. | 442/271 |
| 4,476,186 A | * | 10/1984 | Kato et al. | 442/60 |
| 5,503,899 A | * | 4/1996 | Ashida et al. | 428/151 |
| 5,876,466 A | * | 3/1999 | Nakashima et al. | 8/442 |
| 6,451,404 B1 | * | 9/2002 | Nobuto et al. | 428/91 |
| 6,739,076 B1 | * | 5/2004 | Yoneda et al. | 36/98 |

FOREIGN PATENT DOCUMENTS

| | | |
|---|---|---|
| EP | 0 591 738 A1 | 4/1994 |
| JP | 2002-105871 | 4/2002 |
| JP | 2002115183 | * 4/2002 |

OTHER PUBLICATIONS

U.S. Appl. No. 10/765,834, filed Jan. 2004, Nobuto et al.*
U.S. Appl. No. 10/399,402, filed Apr. 2003, Yasuda et al.*
U.S. Appl. No. 10/186,627, filed Jul. 2002, Yoneda et al.*
U.S. Appl. No. 10/454,499, filed Jun. 2003, Nobuto et al.
U.S. Appl. No. 10/765,834, filed Jan. 2004, Nobuto et al.
Patent Abstracts of Japan, JP 63-085185, Apr. 15, 1988.
Database WPI, AN 2002-577739, XP-002314493, JP 2002-115183, Apr. 19, 2002.
Patent Abstracts of Japan, JP 2003-306876, Oct. 31, 2003.

* cited by examiner

*Primary Examiner*—Cheryl A. Juska
*Assistant Examiner*—Arden B. Sperty
(74) *Attorney, Agent, or Firm*—Oblon, Spivak, McClelland, Maier & Neustadt, P.C.

(57) ABSTRACT

The flame-retardant leather-like sheet substrate of the present invention comprises a layer (A) that is made of an entangled nonwoven fabric comprising a polyester superfine fiber (a) of a single fiber fineness of 0.5 dtex or less containing no flame-retardant component and a flame-retardant polyester superfine fiber (b) of a single fiber fineness of 0.5 dtex or less containing a flame-retardant component in a ratio, (a)/(b), of 100/0 to 40/60 by mass, and a layer (B) that is made of an entangled nonwoven fabric comprising the polyester superfine fiber (a) and the flame-retardant polyester superfine fiber (b) in a ratio, (a)/(b), of 70/30 to 0/100 by mass. The entangled nonwoven fabrics of the layers (A) and (B) are impregnated with an elastomeric polymer (c) containing a flame-retardant component. The ratio of the polyester superfine fiber (a) and the flame-retardant polyester superfine fiber (b) in the flame-retardant leather-like sheet substrate is 10:90 to 90:10 by mass. The flame-retardant leather-like sheet substrate and the artificial leather made thereof have an excellent flame retardancy, a soft and high-quality feeling and appearance, a high abrasion resistance and peel strength, and excellent mechanical properties such as surface strength.

20 Claims, No Drawings

FLAME-RETARDANT LEATHER-LIKE SHEET SUBSTRATE AND PRODUCTION METHOD THEREOF

BACKGROUND OF THE INVENTION

1. Field of the Invention

The present invention relates to a flame-retardant leather-like sheet substrate, a production method thereof, an artificial leather made of the flame-retardant leather-like sheet substrate, and chairs or vehicle seats faced with the artificial leather. Particularly, the present invention relates to a flame-retardant leather-like sheet substrate having a soft and high-quality feeling and excellent in the surface strength such as abrasion resistance and peel strength, a production method thereof and an artificial leather made of the flame-retardant leather-like sheet substrate. With the above properties, the flame-retardant leather-like sheet substrate and the artificial leather made thereof of the present invention are suitably used in various applications requiring high quality, flame retardance and high surface strength such as high abrasion resistance and high peel strength, for example, suitably used as the facing materials for vehicle seats and interior furniture such as cushion seats, sofas and chairs.

2. Description of the Prior Art

Artificial leathers have been conventionally used in various applications such as the facing materials for interiors, clothing, shoes, bags, gloves, and vehicle seats. Recently, of such applications, the facing materials for the vehicle seats such as railway coach seats, automotive seats, airplane seats and ship seats, and for the interior furniture such as cushion seats, sofas and chairs are strongly required to be made of flame-retardant artificial leathers for safety precautions.

The artificial leathers are roughly classified into two types—grained artificial leathers, i.e., leather-like sheet substrates having their surface grained by a wet or dry method, and suede artificial leathers, i.e., leather-like sheet substrates having their surface finished with naps. The artificial leathers of either types generally have a base leather-like sheet substrate comprising an entangled nonwoven fabric having its interspace between entangled fibers impregnated with an elastomeric polymer.

The leather-like sheet substrate or the artificial leather having its base made therefrom are generally made flame-retardant by (1) post-impregnating the leather-like sheet substrate or the grained or suede artificial leather with a flame retardant, (2) lining the back of the leather-like sheet substrate with a flame-retardant woven or knitted fabric, (3) producing the leather-like sheet substrate from fibers incorporated with flame-retardant fine particles, or (4) filling the interspace between entangled fibers of the entangled nonwoven fabric constituting the leather-like sheet substrate with an elastomeric polymer blended with a flame retardant.

In the method (1), when the leather-like sheet substrate is made of superfine fiber bundles, it is very difficult for the flame retardant to enter into the inside of the superfine fiber bundles even when having a fine particle size, leaving the greater part of the flame retardant outside the superfine fiber bundles or on the outer surface of the elastomeric polymer. As a result, the appearance of the artificial leather is spoiled by its surface grimed with the flame retardant, and a long-term flame-retardant effect is difficult to obtain because the flame retardant easily falls off. To prevent the flame retardant from falling off, proposed is to impregnate the leather-like sheet substrate or the artificial leather with a binder resin solution containing the flame retardant. However, it is still difficult by such a method to allow the flame retardant to permeate into the inside of the superfine fiber bundles, and the flame-retardant effect is rather significantly reduced because the surface of the flame retardant is covered with the binder resin. In addition, the flexibility of the leather-like sheet substrate or the artificial leather is spoiled by the impregnation of the binder resin and a sufficient nap-raising is not achieved.

In the method (2), the back of the leather-like sheet substrate or the artificial leather is generally lined with a flame-retardant sheet comprising a woven or knitted fabric containing a flame retardant such as phosphorus compounds and halogen compounds. However, the lining with the flame-retardant sheet is likely to spoil the soft and high-quality feeling that is characteristic of the artificial leather.

The fibers used in the method (3) are generally produced by melt-spinning a fiber-forming polymer such as polyamide and polyethylene incorporated with fine flame-retardant particles. However, the determination of the spinning temperature and the selection of the polymer and the flame retardant are restricted by the stability of the flame retardant and the polymer during the melt-spinning process. Since fiber break is likely to occur, the method is disadvantageous in view of productivity. In addition, since the fibers containing fine flame-retardant particles are significantly reduced in their fiber properties, the leather-like sheet substrate made of such fibers drastically lowers the abrasion-resistant strength of a resultant artificial leather. When such a leather-like sheet substrate is fabricated into a grained artificial leather, the peel strength of the grain surface is lowered, failing to obtain an artificial leather of practical value.

In the method (4), since the flame retardant is added only to the elastomeric polymer to fill the inside of nonwoven fabric without adding the flame retardant to the fibers to form the entangled nonwoven fabric for the leather-like sheet substrate, the flame-retardant effect is generally not sufficient. If the addition amount of the flame retardant to the elastomeric polymer is increased to enhance the flame-retardant effect, the feeling of the artificial leather becomes hard to lost the high-quality feeling.

To solve the above problems in the conventional technique, Japanese Patent Application Laid-Open No. 63-85185 proposes an artificial leather which is produced by the steps of forming a fiber substrate using fibers made of a flame-retardant polyester copolymerized with a phosphorus compound or a halogen compound; forming a microporous fiber substrate by impregnating the fiber substrate with a flame-retardant polyurethane solution containing a bromine-containing modified urethane compound, followed by wet-coagulation; and laminating the microporous fiber substrate with a particular polycarbonate polyurethane surface layer via a polycarbonate polyurethane adhesive layer containing antimony trioxide and a bromine-containing modified urethane compound. However, since a halogen-containing compound such as the bromine-containing modified urethane compound is used as the flame-retardant polyurethane to be impregnated into the fiber substrate and the adhesive polyurethane, the proposed artificial leather evolves harmful gas upon combustion to make it disadvantageous in view of environmental pollution. In the proposed artificial leather, the whole body of the fiber substrate for constituting the base microporous fiber substrate is made of the flame-retardant polyester fiber copolymerized with the phosphorus compound or the halogen compound, or made of the fiber containing the halogen flame retardant. These flame-retardant fibers are insufficient in the strength to result in a poor surface strength such as abrasion resistance and peel strength.

In these circumstances, the inventors have made study to solve the drawbacks in the conventional methods (1) to (4) and to develop a flame-retardant leather-like sheet substrate which is halogen-free, hard to cause environmental pollution, and excellent in safety and flame retardancy while retaining a good soft and high-quality feeling. As a result thereof, the inventors found a flame-retardant leather-like sheet substrate comprising an entangled nonwoven fabric having in its inside a polymer elastomer containing aluminum hydroxide, and have filed a patent application (Japanese Patent Application Laid-Open No. 2002-115183). The entangled nonwoven fabric is made of a flame-retardant superfine fiber having a single fiber fineness of 0.5 dtex or less which is produced from a flame-retardant copolyester copolymerized with an organic phosphorus compound. The flame-retardant leather-like sheet substrate found by the inventors has a soft and high-quality feeling as well as a good flame retardancy. In addition, it is excellent in the safety and the prevention of environmental pollution because of containing no harmful halogen. Therefore, the artificial leather, such as the grained artificial leather and the suede artificial leather, made from the flame-retardant leather-like sheet substrate is particularly suitable as the facing material for vehicle seats and interior furniture.

The inventors have continued the study on the basis of the above finding. As a result thereof, the inventors have found that the flame-retardant leather-like sheet substrate proposed in Japanese Patent Application Laid-Open No. 2002-115183 is desired to be further improved in its surface strength when intended to be used in applications requiring a high surface strength, for example, the use as the facing material for vehicle seats and interior furniture.

The production of fiber using a flame-retardant polyester copolymerized with a phosphorus-containing compound is conventionally known from other publications (for example, Japanese Patent Application Laid-Open Nos. 51-82392, 55-7888, and 2001-164423, and Japanese Patent Publication No. 55-41610), and a flame-retardant polyurethane having a phosphorus compound-derived structural unit introduced into its polyurethane molecule is also known (for example, Japanese Patent Application Laid-Open No. 9-194559). However, these patent documents are completely silent as to using the flame-retardant polyester fiber and the flame-retardant polyurethane in the production of the flame-retardant leather-like sheet substrate. Therefore, these patent documents describe or suggest nothing about providing the flame-retardant leather-like sheet substrate excellent in the flame retardancy as well as in the surface strength such as abrasion resistance and peel strength while having a soft and high-quality feeling.

SUMMARY OF THE INVENTION

An object of the present invention is to provide a durable, flame-retardant leather-like sheet substrate which is highly flame-retardant, excellent in a soft and high-quality feeling and appearance, and excellent in mechanical properties such as surface strength as represented by high abrasion resistance and peel strength.

Another object of the present invention is to provide a production method of the flame-retardant leather-like sheet substrate. Still another object of the present invention is to provide an artificial leather comprising the flame-retardant leather-like sheet substrate. Particularly, a main object of the present invention is to provide a flame-retardant leather-like sheet substrate or an artificial leather which is effective for use in applications requiring the flame retardancy as well as a soft and good feeling, a good appearance, and a high surface strength such as abrasion resistance and peel strength, for example, for use as a facing material for vehicle seats such as railway coach seats, automotive seats, airplane seats and ship seats, and interior furniture such as cushion seats, sofas and chairs.

The inventors have continuously made study on the leather-like sheet substrate disclosed in Japanese Patent Application Laid-Open No. 2002-115183 filed by the inventors. As a result thereof, the inventors have found that the flame-retardant leather-like sheet substrate of Japanese Patent Application Laid-Open Nos. 63-85185 and 2002-115183 comprising an entangled nonwoven fabric made of a flame-retardant polyester superfine fiber having in its inside an elastomeric polymer containing a flame retardant is significantly improved in the surface strength such as abrasion resistance and peel strength while retaining a soft and high-quality feeling, a good appearance and a good flame retardancy, by forming the nonwoven fabric from a combination in a specific ratio of a polyester superfine fiber containing a flame-retardant component and a polyester superfine fiber containing no flame-retardant component in stead of forming from only a flame-retardant polyester superfine fiber. The inventors have further found that an artificial leather produced from such a flame-retardant leather-like sheet substrate is extremely suitable as a facing material for vehicle seats and interior furniture which is required to have a high surface strength in addition to a good feeling, a good appearance and an excellent flame retardancy.

Thus, the present invention provides a flame-retardant leather-like sheet substrate, which comprises (A) a layer of an entangled nonwoven fabric comprising a polyester superfine fiber (a) of a single fiber fineness of 0.5 dtex or less containing no flame-retardant component and a flame-retardant polyester superfine fiber (b) of a single fiber fineness of 0.5 dtex or less containing a flame-retardant component in a ratio, (a)/(b), of 100/0 to 40/60 by mass, the entangled nonwoven fabric containing in its inside an elastomeric polymer (c) containing a flame-retardant component; and (B) a layer of an entangled nonwoven fabric comprising the polyester superfine fiber (a) and the flame-retardant polyester superfine fiber (b) in a ratio, (a)/(b), of 70/30 to 0/100 by mass, the entangled nonwoven fabric containing in its inside an elastomeric polymer (c) containing a flame-retardant component, the ratio of the polyester superfine fiber (a) and the flame-retardant polyester superfine fiber (b) in the flame-retardant leather-like sheet substrate being 10:90 to 90:10 by mass.

The present invention further provide a method of producing a flame-retardant leather-like sheet substrate, comprising:

(I) a step of producing an entangled nonwoven fabric (NWa$_0$) comprising a superfine fiber-forming fiber (a$_0$) capable of forming a polyester superfine fiber (a) of a single fiber fineness of 0.5 dtex or less containing no flame-retardant component and a superfine fiber-forming fiber (b$_0$) capable of forming a flame-retardant polyester superfine fiber (b) of a single fiber fineness of 0.5 dtex or less containing a flame-retardant component in a ratio that provides the polyester superfine fiber (a) and the flame-retardant polyester superfine fiber (b) in a ratio, (a)/(b), of 100/0 to 40/60 by mass; and producing an entangled nonwoven fabric (NWb$_0$) comprising the superfine fiber-forming fiber (a$_0$)

and the superfine fiber-forming fiber ($b_0$) in a ratio that provides the polyester superfine fiber (a) and the flame-retardant polyester superfine fiber (b) in a ratio, (a)/(b), of 70/30 to 0/100;

(II) a step of laminating the entangled nonwoven fabric ($NWa_0$) and the entangled nonwoven fabric ($NWb_0$);

(III) a step of impregnating the entangled nonwoven fabric ($NWa_0$) and the entangled nonwoven fabric ($NWb_0$) with an elastomeric polymer (c) containing the flame-retardant component; and (IV) a step of converting the superfine fiber-forming fiber ($a_0$) and the superfine fiber-forming fiber ($b_0$) respectively into the polyester superfine fiber (a) and the flame-retardant polyester superfine fiber (b).

The present invention further provides a method of producing a flame-retardant leather-like sheet substrate, comprising:

(i) a step of producing an entangled nonwoven fabric ($NWe_0$) comprising a superfine fiber-forming fiber ($e_0$) which has a cross-sectional structure in which a polyester component containing no flame-retardant component is substantially not in contact with a polyester component containing a flame-retardant component and which is capable of forming a mixture of a polyester superfine fiber (a) of a single fiber fineness of 0.5 dtex or less containing no flame-retardant component and a flame-retardant polyester superfine fiber (b) of a single fiber fineness of 0.5 dtex or less containing the flame-retardant component in a ratio, (a)/(b), of 100/0 to 40/60 by mass; and producing an entangled nonwoven fabric ($NWf_0$) comprising a superfine fiber-forming fiber ($f_0$) which has a cross-sectional structure in which a polyester component containing no flame-retardant component is substantially not in contact with a polyester component containing the flame-retardant component and which is capable of forming a mixture of the polyester superfine fiber (a) and the flame-retardant polyester superfine fiber (b) in a ratio, (a)/(b), of 70/30 to 0/100 by mass;

(ii) a step of laminating the entangled nonwoven fabric ($NWe_0$) and the entangled nonwoven fabric ($NWf_0$);

(iii) a step of impregnating the entangled nonwoven fabric ($NWe_0$) and the entangled nonwoven fabric ($NWf_0$) with an elastomeric polymer (c) containing the flame-retardant component; and (iv) a step of converting the superfine fiber-forming fiber ($e_0$) and the superfine fiber-forming fiber ($f_0$) into the polyester superfine fiber (a) and the flame-retardant polyester superfine fiber (b).

DETAILED DESCRIPTION OF THE PREFERRED EMBODIMENTS

The present invention will be explained below in more detail.

The flame-retardant leather-like sheet substrate of the present invention comprises a layer (A) and a layer (B). The layer (A) comprises an entangled nonwoven fabric made of a polyester superfine fiber (a) of a single fiber fineness of 0.5 dtex or less containing no flame-retardant component and a flame-retardant polyester superfine fiber (b) of a single fiber fineness of 0.5 dtex or less containing a flame-retardant component in a ratio, (a)/(b), of 100/0 to 40/60 by mass. The entangled nonwoven fabric contains in its inside an elastomeric polymer (c) containing a flame-retardant component. The layer (B) comprises an entangled nonwoven fabric made of the polyester superfine fiber (a) and the flame-retardant polyester superfine fiber (b) in a ratio, (a)/(b), of 70/30 to 0/100 by mass. The entangled nonwoven fabric of the layer (B) also contains in its inside the elastomeric polymer (c) containing the flame-retardant component.

The "flame-retardant component" referred to herein means at least one of a flame retardant (flame-retarding additive) being added to the polyester superfine fiber to make it flame-retardant and a flame-retarding copolymerizable component that has been copolymerized with polyester to provide a flame-retardant polyester for forming the superfine fiber.

Thus, the "polyester superfine fiber (a) containing no flame-retardant component" forming the entangled nonwoven fabric of the layer (A) and the layer (B) means a superfine fiber made of a polyester containing neither the flame-retarding additive nor the flame-retarding copolymerizable component. The "flame-retardant polyester superfine fiber (b) containing a flame-retardant component" means a superfine fiber made of a polyester containing at least one of the flame-retarding additive and the flame-retarding copolymerizable component.

To impart a high abrasion resistance and peel strength to the flame-retardant leather-like sheet substrate by further improving the mechanical strength such as the surface strength, the tensile strength of the non-flame-retardant polyester superfine fiber (a) constituting the entangled nonwoven fabric of the layer (A) is preferably 1.6 g/dtex or more, and more preferably 2.0 g/dtex or more, with 10 g/dtex or less being preferred and 5 g/dtex being more preferred in view of spinnability. The non-flame-retardant polyester superfine fiber (a) may be suitably produced from one or more types of polyester, such as poly(ethylene terephthalate), poly(butylene terephthalate) and poly(trimethylene terephthalate), containing neither the flame-retarding adhesive (flame retardant) nor the flame-retarding copolymerizable component.

The flame-retardant polyester superfine fiber (b) may contain, as the flame-retardant component, at least one flame-retarding adhesive conventionally used for making polyester resins and polyester fibers flame-retardant, such as organic phosphorus compounds, inorganic phosphorus compounds, organic halogen compounds, inorganic halogen compounds, organic phosphorus/halogen-containing compounds, inorganic phosphorus/halogen-containing compounds, antimony oxide, titanium oxide and metal hydroxides. Additionally or alternatively, the polyester constituting the superfine fiber may contain the flame-retarding copolymerizable component.

It is preferred to form the flame-retardant polyester superfine fiber (b) from a copolyester containing the flame-retarding copolymerizable component because the falling off of the flame-retardant component is prevented in the processes for spinning and producing the flame-retardant leather-like sheet substrate and the artificial leather. It is more preferred to form the flame-retardant polyester superfine fiber (b) from a halogen-free copolyester having in its molecule a copolymerized unit derived from the phosphorus-containing compound, because the environmental pollution by halogen can be avoided in combination with the prevention of the falling off of the flame-retardant component.

When the flame-retardant polyester superfine fiber (b) is made of the halogen-free copolyester having the copolymerized unit derived from the phosphorus-containing compound, the copolymerized unit may be a structural unit derived from any of the phosphorus-containing compounds, such as oxaphosphorane, phosphinic acid derivatives, phosphaphenanthrene derivatives and phosphoric triesters, disclosed in the above patent documents (Japanese Patent Application Laid-Open Nos. 2002-115183, 51-82392, 55-7888, 2001-164423 and 9-194559 and Japanese Patent Publication No. 55-41610). Of the above, preferred is the structural unit derived from the phosphorus-containing compound having its phosphorus component in the side chain because of easy handling in the polymerization process and prevention of the strength from being lowered by hydrolysis. Specifically suitable is a structural unit having a skeleton derived from 9,10-dihydro-9-oxa-10-phosphaphenanthlene-10-oxide.

The base polyester for the copolyester having the structural unit derived from the phosphorus-containing compound may be selected from known polyesters represented by poly(ethylene terephthalate) and poly(butylene terephthalate), their modified polymers, their mixed polymers and their copolymers.

The copolyester having the structural unit derived from the phosphorus-containing compound is produced, for example, by performing the ester exchange reaction for producing the base polyester in the presence of the phosphorus-containing compound, or by adding the phosphorus-containing compound before or at initial stage of the polycondensation reaction for producing the base polyester by direct esterification, although not limited thereto.

When the flame-retardant polyester superfine fiber (b) is made of the halogen-free copolyester having the copolymerized unit derived from the phosphorus-containing compound, the concentration of phosphorus atom in the flame-retardant polyester superfine fiber (b) is preferably 6,000 to 50,000 ppm, more preferably 9,000 to 20,000 ppm. If less than 6,000 ppm, the flame retardancy of the flame-retardant leather-like sheet substrate tends to become insufficient. A concentration exceeding 50,000 ppm is likely to cause embrittlement of the polyester forming the superfine fiber, reduction in the melt spinnability, and reduction in the strength and elongation of the flame-retardant polyester superfine fiber.

The entangled nonwoven fabric of the layer (A) is made of a polyester superfine fiber (a) of a single fiber fineness of 0.5 dtex or less containing no flame-retardant component and a flame-retardant polyester superfine fiber (b) of a single fiber fineness of 0.5 dtex or less containing a flame-retardant component in a ratio, (a)/(b), of 100/0 to 40/60 by mass.

The ratio, (a)/(b), is preferably 100/0 to 60/40, more preferably 100/0 to 80/20, and most preferably 100/0 because the surface strength and the flame retardancy of the resultant suede artificial leather can be well balanced without using the flame-retardant polyester superfine fiber (b) in the layer (A). If the proportion of (b) exceeds 60%, the resultant leather-like sheet substrate has a reduced surface strength, although sufficient in the flame retardancy.

The entangled nonwoven fabric of the layer (B) is made of the polyester superfine fiber (a) of a single fiber fineness of 0.5 dtex or less containing no flame-retardant component and the flame-retardant polyester superfine fiber (b) of a single fiber fineness of 0.5 dtex or less containing a flame-retardant component in a ratio, (a)/(b), of 70/30 to 0/100 by mass.

The ratio, (a)/(b), is preferably 50/50 to 0/100, more preferably 30/70 to 0/100, and most preferably 0/100 because a satisfactory flame retardancy of the artificial leather can attained without using the polyester superfine fiber (a) in the layer (B), no matter what kind of superfine fibers is the layer (A) made of. If the proportion of (a) exceeds 70%, the resultant artificial leather fails to acquire a good flame retardancy. To attain a good flame retardancy, the proportion of the superfine fiber (b) in the layer (A) is preferably higher than 70%. However, this reduces the surface strength of the resultant artificial leather and does not impart a sufficient flame retardancy. Therefore, to impart the flame retardancy to the resultant artificial leather, another flame retardant is required to be added in an amount more than needed, resulting in a hard feeling.

When the flame-retardant polyester superfine fiber (b) is made of the halogen-free copolyester having the copolymerized unit derived from the phosphorus-containing compound, the concentration of phosphorus atom in the entangled nonwoven fabric comprising the laminate of the layer (A) and the layer (B) is preferably 3,000 ppm or more, more preferably 4,500 ppm or more based on the total mass of the non-flame-retardant polyester superfine fiber (a) and the flame-retardant polyester superfine fiber (b). If less than 3,000 ppm, the flame retardancy of the flame-retardant leather-like sheet substrate tends to be insufficient even when the elastomeric polymer (c) having the flame-retardant component is introduced into the inside of the entangled nonwoven fabric of the layer (A) and the layer (B). If exceeding 20,000 ppm, the mechanical strength of the resultant leather-like sheet substrate is reduced.

In view of the appearance and the feeling of the flame-retardant leather-like sheet substrate and the artificial leather made thereof, the single fiber finenesses of the non-flame-retardant polyester superfine fiber (a) and the flame-retardant polyester superfine fiber (b) is 0.5 dtex or less, preferably 0.0001 to 0.3 dtex, and more preferably 0.001 to 0.2 dtex.

If the single fiber finenesses of the non-flame-retardant polyester superfine fiber (a) and the flame-retardant polyester superfine fiber (b) exceed 0.5 dtex, the feeling of the flame-retardant leather-like sheet substrate is spoiled and the sense of fulfillment is lost. Particularly, the suede artificial leather made from such a flame-retardant leather-like sheet substrate may be inferior in the sense of nap and the writing effect. If less than 0.0001 dtex, the dyeability may become low to result in defective color tone.

The non-flame-retardant polyester superfine fiber (a) and the flame-retardant polyester superfine fiber (b) may contain, if desired, at least one of colorants such as carbon black, dye and pigment, stabilizers such as light stabilizer, matting agents, anti-fungus agents and antistatic agents. For example, in the masterbatch-dyeing to black by carbon black, the addition amount of carbon black is preferably about 0.5 to 8% by mass in view of the spinnability and the flame retardancy.

Carbon black is highly flammable. Therefore, when one part by mass, for example, of carbon black is contained in 100 parts by mass in total of the non-flame-retardant polyester superfine fiber (a) and the flame-retardant polyester superfine fiber (b), the concentration of phosphorus atom in the flame-retardant polyester superfine fiber (b) is preferably 6,000 ppm or more. The concentration of phosphorus atom is preferably 8,000 ppm when two parts by mass of carbon black is contained.

In the flame-retardant leather-like sheet substrate of the present invention, the ratio of the non-flame-retardant polyester superfine fiber (a) and the flame-retardant polyester superfine fiber (b), (a):(b), is 10:90 to 90:10, preferably 15:85 to 85:15, and more preferably 20:80 to 80:20 by mass.

If the proportion of the non-flame-retardant polyester superfine fiber (a) is less than 10% by mass, i.e., the proportion of the flame-retardant polyester superfine fiber (b) exceeds 90% by mass, the flame-retardant leather-like sheet substrate is reduced in its high elongation property and surface strength such as abrasion resistance. On the other hand, if the proportion of the non-flame-retardant polyester superfine fiber (a) exceeds 90% by mass, i.e., the proportion of the flame-retardant polyester superfine fiber (b) is less than 10% by mass, the flame retardancy of the flame-retardant leather-like sheet substrate is lowered.

The "ratio by mass of the non-flame-retardant polyester superfine fiber (a) and the flame-retardant polyester superfine fiber (b)" referred to herein means the ratio of the mass of the non-flame-retardant polyester superfine fiber (a) and the mass of the flame-retardant polyester superfine fiber (b) contained in a unit area of the flame-retardant leather-like sheet substrate having the layer (A) and the layer (B).

When the layer (A) and the layer (B) has the same mass ratio, (a)/(b), in the range of 40/60 to 70/30, the laminate boundary between the layers is not clear on the cross section in the depth direction of the flame-retardant leather-like sheet substrate. In this case, however, it is defined that the flame-retardant leather-like sheet substrate has both the layer (A) and the layer (B).

The elastomeric polymer (c) to be contained in the inside of the entangled nonwoven fabric constituting each of the layers (A) and (B) of the flame-retardant leather-like sheet substrate is not particularly limited as far as it is flexible, elastically recovering, durable and resistant to abrasion. Examples thereof include polyurethane elastomers, polyester thermoplastic elastomers, polyamide thermoplastic elastomers, elastic hydrogenated products of styrene-isoprene block copolymers, acrylic rubber, natural rubber, SBR, NBR, polychloroprene, polyisoprene, and isobutylene-isoprene rubber. These elastomeric polymers may be use alone or in combination of two or more.

Of the above, preferred as the elastomeric polymer (c) is the polyurethane elastomer because they are excellent in the flexibility, elastomeric recovery, durability such as abrasion resistance, mechanical properties such as tensile strength and dyeability, and easy to form porous structure.

The polyurethane elastomer may be selected from any elastomeric polyurethane resins, and is preferably a polyurethane produced by the reaction of a high-molecular diol having a number average molecular weight of 500 to 5000 as the soft segment and an organic diisocyanate as the hard segment in the presence of a low-molecular chain extender.

If the number average molecular weight of the high-molecular diol is less than 500, the resultant polyurethane is less flexible because of excessively short soft segment to make the production of the leather-like sheet substrate difficult. On the other hand, if exceeding 5000, the proportion of urethane linkage in the polyurethane is relatively reduced to lower the durability, heat resistance and resistance to hydrolysis, thereby making the production of the flame-retardant leather-like sheet substrate having practical properties difficult.

Examples of the high-molecular diol include polyester diols obtained by the reaction of a dicarboxylic acid component and a diol component, polylactone diols, polycarbonate diols, polyester polycarbonate diols, and polyether diols. These high-molecular diols may be used alone or in combination of two or more.

The organic diisocyanate may be selected from any organic diisocyanates conventionally used in the production of polyurethane. Examples thereof include aromatic diisocyanates such as 4,4'-diphenylmethane diisocyanate, tolylene diisocyanate, phenylene diisocyanate, xylylene diisocyanate, isophorone diisocyanate, and 1,5-naphthylene diisocyanate; aliphatic diisocyanates such as hexamethylene diisocyanate; and alicyclic diisocyanates such as 4,4'-dicyclohexylmethane diisocyanate and hydrogenated xylylene diisocyanate. These organic diisocyanates may be used alone or in combination of two or more.

The low-molecular chain extender may be selected from any low-molecular chain extenders conventionally used in the production of polyurethane, particularly, those having a molecular weight of 400 or less. Examples thereof include diols such as ethylene glycol, propylene glycol, 1,4-butanediol, 1,6-hexanediol, 3-methyl-1,5-pentanediol, neopentyl glycol, N-methyldiethanol amine, 1,4-cyclohexanediol, bis (β-hydroxyethyl) terephthalate, xylylene glycol, and 1,4-bis (β-hydroxyethoxy)benzene; diamines such as hydrazine, ethylenediamine, propylenediamine, isophoronediamine, piperazine and its derivatives, phenylenediamine, tolylenediamine, xylylenediamine, adipodihydrazide, isophthalodihydrazide, hexamethylenediamine, 4,4'-diaminophenylmethane and 4,4'-dicyclohexylmethanediamine; and aminoalcohols such as aminoethyl alcohol and aminopropyl alcohol. These low-molecular chain extenders may be use alone or in combination of two or more.

The polyurethane is preferably produced by the reaction of the high-molecular diol, the organic diisocyanate and the low-molecular chain extender while controlling the equivalent ratio of (total isocyanate group)/(total functional group such as hydroxyl group and amino group capable of reacting with isocyanate group) within 0.9 to 1.1, because the flame-retardant leather-like sheet substrate and the artificial leather having a high tearing strength can be obtained.

To improve the solvent resistance, the heat resistance and the hot-water resistance of polyurethane, a tri- or more functional triol such as trimethylolpropane or a tri- or more functional amine, if desired, may be reacted to form a cross-linked structure in polyurethane.

The flame-retardant component to be contained in the elastomeric polymer (c) may be a flame retardant conventionally used to make organic polymer materials flame-retardant. Examples thereof include organic flame retardants such as organophosphorus flame retardants, organohalogen flame retardants and organonitrogen flame retardants; and inorganic flame retardants such as metal hydroxides, red phosphorus and silicon, with aluminum hydroxide being preferred. Aluminum hydroxide does not degrade the elastomeric polymer (c), the non-flame-retardant polyester superfine fiber (a) and the flame-retardant polyester superfine fiber (b), not dissolve in a coagulation bath for coagulating the elastomeric polymer (c) impregnated into the nonwoven fabric and in a treating solution for making the superfine fiber-forming fiber into the superfine fiber, and is not changed or degraded by the coagulation bath and the treating solution. Therefore, the elastomeric polymer (c) is stably held in the nonwoven fabric to impart a good flame retardancy to the leather-like sheet substrate.

The average particle size of aluminum hydroxide is preferably 2 μm or less, more preferably 1 μm or less in view of the dispersion stability in an impregnating solution and the flame-retardant effect, although not limited thereto. To keep the dispersibility good, the average particle size is preferably 0.01 μm or more. If desired, aluminum hydroxide may be treated to improve its humidity resistance, heat resistance, water resistance and acid resistance.

When aluminum hydroxide is use as the flame-retardant component, the content of aluminum hydroxide in the elastomeric polymer (c) is preferably 10 to 200 parts by mass, more preferably 30 to 100 parts by mass based on 100 parts by mass of the total elastomeric polymer (c) contained in the layers (A) and (B). If less than 10 parts by mass, the flame-retardant leather-like sheet substrate may become difficult to obtain a sufficient flame retardancy. If more than 200 parts by mass, it becomes difficult to stably incorporate aluminum hydroxide into the elastomeric polymer (c) to make the elastomeric polymer (c) susceptible to the degradation and the reduction in properties, thereby likely to make the feeling of the flame-retardant leather-like sheet substrate hard.

In the present invention, as mentioned above, a flame retardancy of sufficient level can be attained without causing the environmental problem associated with the use of halogen compounds by forming the flame-retardant polyester superfine fiber (b) from a halogen-free copolyester containing phosphorus atom in its molecule, and by using aluminum hydroxide as the flame-retardant component to be contained in the elastomeric polymer (c).

The flame-retardant effect of the present invention is difficult to theoretically explain, but may be due to a synergetic effect of the phosphorus component to form a carbonized film and the heat absorption by aluminum hydroxide, which inhibit the combustion at different stages.

The elastomeric polymer (c) may contain, if desired, carbon black to heighten the depth of color of the flame-retardant leather-like sheet substrate, in particular, preferably contains carbon black to make it in deep color such as black. The content of carbon black in the elastomeric polymer (c), if contained, is preferably 7 parts by mass or less, more preferably 5 parts by mass or less based on 100 parts by mass of the elastomeric polymer (c). In this case, the content of aluminum hydroxide is preferably increased within the above range of 100 to 200 parts by mass. For example, when carbon black is contained 3 parts by mass based on 100 parts by mass of the elastomeric polymer (c), the content of aluminum hydroxide is preferably 25 parts by mass or more, more preferably 40 parts by mass or more.

In the flame-retardant leather-like sheet substrate of the present invention, the ratio by mass of (total mass of the non-flame-retardant polyester superfine fiber (a) and the flame-retardant polyester superfine fiber (b) constituting the flame-retardant leather-like sheet substrate):(mass of the elastomeric polymer (c) exclusive of the flame-retardant component) is preferably 30:70 to 95:5, more preferably 40:60 to 85:15, because a soft feeling, like natural leathers, is obtained and the abrasion resistance and the flame retardancy are ensured. If the total proportion of the non-flame-retardant polyester superfine fiber (a) and the flame-retardant polyester superfine fiber (b) is less than 30% by mass based on the total mass of the non-flame-retardant polyester superfine fiber (a), the flame-retardant polyester superfine fiber (b) and the elastomeric polymer (c), the feeling tends to be rubber-like and the flame retardancy is likely to become instable. If more than 95% by mass, the falling off of the superfine fibers and the reduction of the pilling resistance tend to occur.

In the flame-retardant leather-like sheet substrate of the present invention, it is preferred that the non-flame-retardant polyester superfine fiber (a) and the flame-retardant polyester superfine fiber (b) are not substantially bonded to the elastomeric polymer (c) that is contained in the inside of the nonwoven fabric made of the superfine fibers (a) and (b), i.e., the superfine fibers (a) and (b) are separated from the elastomeric polymer (c). With such a non-bonding structure, the superfine fibers (a) and (b) are not constrained by the elastomeric polymer (c) to have an increased freedom of movement, thereby ensuring a soft feeling like natural leathers.

The thickness of the flame-retardant leather-like sheet substrate may be arbitrarily selected depending on the applications, and preferably about 0.5 to 2.0 mm, and more preferably about 0.6 to 1.5 mm in view of the feeling, the strength and the easiness of handling.

The mass per unit area of the flame-retardant leather-like sheet substrate is preferably 250 to 1,000 g/m$^2$, and more preferably 300 to 600 g/m$^2$ to obtain a soft feeling and a moderate elasticity and recovery.

The thickness ratio of the layer (A) and the layer (B) in the flame-retardant leather-like sheet substrate is preferably 50:50 to 20:80 in view of the flame retardancy, the strength and the abrasion resistance.

The production method of the flame-retardant leather-like sheet substrate of the present invention is not specifically limited as far as the structure and the properties mentioned above can be attained. The polyester superfine fiber for constituting the flame-retardant leather-like sheet substrate may be directly produced by a melt-blown method, or alternatively, by easily produced from a superfine fiber-forming fiber as described in the following production method (1) or (2).

Production Method (1) of Flame-Retardant Leather-Like Sheet Substrate:

In the production method (1), the flame-retardant leather-like sheet substrate is produced by a method comprising:

(I) a step of producing an entangled nonwoven fabric (NWa$_0$) comprising a superfine fiber-forming fiber (a$_0$) capable of forming a polyester superfine fiber (a) of a single fiber fineness of 0.5 dtex or less containing no flame-retardant component and a superfine fiber-forming fiber (b$_0$) capable of forming a flame-retardant polyester superfine fiber (b) of a single fiber fineness of 0.5 dtex or less containing a flame-retardant component in a ratio that provides the polyester superfine fiber (a) and the flame-retardant polyester superfine fiber (b) in a ratio, (a)/(b), of 100/0 to 40/60 by mass; and producing an entangled nonwoven fabric (NWb$_0$) comprising the superfine fiber-forming fiber (a$_0$) and the superfine fiber-forming fiber (b$_0$) in a ratio that provides the polyester superfine fiber (a) and the flame-retardant polyester superfine fiber (b) in a ratio, (a)/(b), of 70/30 to 0/100;

(II) a step of laminating the entangled nonwoven fabric (NWa$_0$) and the entangled nonwoven fabric (NWb$_0$);

(III) a step of impregnating the entangled nonwoven fabric (NWa$_0$) and the entangled nonwoven fabric (NWb$_0$) with an elastomeric polymer (c) containing the flame-retardant component; and (IV) a step of converting the superfine fiber-forming fiber (a$_0$) and the superfine fiber-forming fiber (b$_0$) respectively into the polyester superfine fiber (a) and the flame-retardant polyester superfine fiber (b).

Production Method (2) of Flame-Retardant Leather-Like Sheet Substrate:

In the production method (2), the flame-retardant leather-like sheet substrate is produced by a method comprising:

(i) a step of producing an entangled nonwoven fabric (NWe$_0$) comprising a superfine fiber-forming fiber (e$_0$) which has a cross-sectional structure in which a polyester component containing no flame-retardant component is substantially not in contact with a polyester component containing a flame-retardant component and which is capable of forming a mixture of a polyester superfine fiber (a) of a single fiber fineness of 0.5 dtex or less containing no flame-retardant component and a flame-retardant polyester superfine fiber (b) of a single fiber fineness of 0.5 dtex or less containing the flame-retardant component in a ratio, (a)/(b), of 100/0 to 40/60 by mass, and producing an entangled nonwoven fabric (NWf$_0$) comprising a superfine fiber-forming fiber ($f_o$) which has a cross-sectional structure in which a polyester component containing no flame-retardant component is substantially not in contact with a polyester component containing the flame-retardant component and which is capable of forming a mixture of the polyester superfine fiber (a) and the flame-retardant polyester superfine fiber (b) in a ratio, (a)/(b), of 70/30 to 0/100 by mass;

(ii) a step of laminating the entangled nonwoven fabric ($NWe_o$) and the entangled nonwoven fabric ($NWf_o$);

(iii) a step of impregnating the entangled nonwoven fabric ($NWe_o$) and the entangled nonwoven fabric ($NWf_o$) with an elastomeric polymer (c) containing the flame-retardant component; and (iv) a step of converting the superfine fiber-forming fiber ($e_o$) and the superfine fiber-forming fiber ($f_o$) into the polyester superfine fiber (a) and the flame-retardant polyester superfine fiber (b).

In the production method (1), preferably usable as the superfine fiber-forming fiber ($a_o$) is a sea-island, mix- or conjugate-spun fiber comprising an island component of a polyester containing no flame-retardant component and a sea component of another polymer different from the polyester in the solubility and degradability; a multi-layer, mix- or conjugate-spun fiber comprising a layer of a polyester containing no flame-retardant component and a layer of another polymer different from the polyester in the solubility and degradability; or a mix- or conjugate-spun fiber comprising a multi-layer island component comprising a layer of a polyester containing no flame-retardant component and a layer of another polymer different from the polyester in the solubility and degradability and a sea component of another polymer different from the polyester in the solubility and degradability.

In the production method (1), preferably usable as the superfine fiber-forming fiber ($b_o$) is a sea-island, mix- or conjugate-spun fiber comprising an island component of a polyester containing the flame-retardant component and a sea component of another polymer different from the polyester in the solubility and degradability; a multi-layer, mix- or conjugate-spun fiber comprising a layer of a polyester containing the flame-retardant component and a layer of another polymer different from the polyester in the solubility and degradability; or a mix- or conjugate-spun fiber comprising a multi-layer island component comprising a layer of a polyester containing the flame-retardant component and a layer of another polymer different from the polyester in the solubility and degradability and a sea component of another polymer different from the polyester in the solubility and degradability.

The superfine fiber-forming fibers ($a_o$) and ($b_o$) comprising the sea-island or multi-layer mix-spun fiber or conjugate-spun fiber may be produced by a conventionally known melt-mix spinning method or melt-conjugate spinning method.

The production method (1) will be explained below in more detail.

Production Method (1)

(1)-1a

A sea-island or multi-layer superfine fiber-forming fiber ($a_o$) is produced by the melt-mix spinning method or the melt-conjugate spinning method, where the island component of a polyester containing no flame-retardant component and the sea component of another polymer are sea-island, mix- or conjugate-spun, or a polyester containing no flame-retardant component and another polymer are multi-layer, mix- or conjugate-spun. The sea-island or multi-layer superfine fiber-forming fiber ($a_o$) thus produced is then subjected to drawing, crimping and cutting processes to obtain staples.

(1)-1b

The same procedure of (1)-1a is repeated except for using a polyester containing a flame-retardant component in place of the polyester containing no flame-retardant component to produce staples of the superfine fiber-forming fiber ($b_o$).

The single fiber fineness of the staples is preferably about 1.0 to 10.0 dtex, more preferably about 3.0 to 6.0 dtex for a good traveling capability through a card. Then, the staples of the superfine fiber-forming fiber ($a_o$) and the staples of the superfine fiber-forming fiber ($b_o$) are blended in a ratio corresponding to a ratio of the polyester superfine fiber (a) and the flame-retardant polyester superfine fiber (b), (a)/(b), of 100/0 to 40/60 by mass. The staples are opened by a card and formed into a web through a webber. The webs are stacked in a desired weight and thickness to prepare a web ($Wa_o$). Separately, the staples of the superfine fiber-forming fiber ($a_o$) and the staples of the superfine fiber-forming fiber ($b_o$) are blended in a ratio corresponding to a ratio of the polyester superfine fiber (a) and the flame-retardant polyester superfine fiber (b), (a)/(b), of 70/30 to 0/100 by mass. The staples are opened by a card and formed into a web through a webber. The webs are stacked in a desired weight and thickness to prepare a web ($Wb_o$).

(1)-2

Then, the web ($Wa_o$) and the web ($Wb_o$) are stacked. The webs are preferably stacked into a two-layer laminate with the web ($Wa_o$) on the web ($Wb_o$), although not limited thereto. In some cases, the webs may be stacked into a three-layer laminate of ($Wa_o$)/($Wb_o$)/($Wa_o$) or ($Wb_o$)/($Wa_o$)/($Wb_o$), and then, two layers may be taken out of the laminate with the web ($Wa_o$) on the web ($Wb_o$) by slicing along the intermediate layer after the entanglement followed by the impregnation of the elastomeric polymer or the fibrillation into superfine fibers. The web ($Wa_o$) and the web ($Wb_o$) are stacked so as to provide the flame-retardant leather-like sheet substrate after the fibrillation into superfine fibers, in which the ratio of the non-flame-retardant polyester superfine fiber (a) and the flame-retardant polyester superfine fiber (b) constituting the nonwoven fabrics of the layer (A) and the layer (B) is 10:90 to 90:10 by mass, preferably 15:85 to 85:15.

(1)-3

Then, the laminated web obtained in (1)-2 is subjected to a known entangling treatment such as needle-punching and high-pressure hydroentanglement to make the web ($Wa_o$) and the web ($Wb_o$) respectively into the entangled nonwoven fabric ($NWa_o$) and the entangled nonwoven fabric ($NWb_o$).

Alternatively, the laminated web after further laminated with a woven or knitted fabric may be hydroentangled to a composite entangled nonwoven fabric. The entangled nonwoven fabric obtained in this process preferably has a mass per unit area of about 200 to 1500 g/m$^2$ and a thickness of about 1 to 10 mm in view of easiness of handling.

The entangled nonwoven fabric obtained in this step may be subjected to pre-setting by bonding the fibers in the nonwoven fabric using a polyvinyl alcohol size or by melting the surface of constituent fibers. With such a treatment, the nonwoven fabric is prevented from being structurally broken by the tension applied thereto in the subsequent step for impregnating the elastomeric polymer. In particular, the nonwoven fabric surfaced by melting the surface of constituent fibers enhances the surface flatness of the resultant flame-retardant leather-like sheet substrate.

(1)-4

Next, after impregnated with the elastomeric polymer (c) containing the flame-retardant component, the superfine fiber-forming fiber ($a_0$) and the superfine fiber-forming fiber ($b_0$) constituting the nonwoven fabric obtained in (1)-3 are fibrillated into superfine fibers to produce the flame-retardant leather-like sheet substrate. Alternatively, after fibrillating the superfine fiber-forming fiber ($a_0$) and the superfine fiber-forming fiber ($b_0$) constituting the nonwoven fabric obtained in (1)-3 into superfine fibers, the elastomeric polymer (c) containing the flame-retardant component is impregnated to produce the flame-retardant leather-like sheet substrate.

In this step, the nonwoven fabric before or after fibrillation into superfine fibers is dipped into a solution or dispersion of the elastomeric polymer (c) containing the flame-retardant component to impregnate the elastomeric polymer and the flame-retardant component into the nonwoven fabric, and then, the impregnated elastomeric polymer (c) is coagulated into porous solid in a coagulation bath. Alternatively, the nonwoven fabric before or after fibrillation into superfine fibers is dipped into an emulsion of the elastomeric polymer (c) containing the flame-retardant component to impregnate the elastomeric polymer and the flame-retardant component into the nonwoven fabric, and then, the impregnated emulsion is gelated under heating.

When an insoluble flame-retardant component such as aluminum hydroxide is used, the insoluble flame-retardant component should be dispersed in advance in a solution containing the elastomeric polymer (c) in the presence of, if desired, an additive such as a coagulation regulator and a dispersant. In addition, the solution of the elastomeric polymer (c) may contain a degradation inhibitor or a colorant for the elastomeric polymer (c) as far as the effect of the present invention is not adversely affected.

The fibrillation of the superfine fiber-forming fiber ($a_0$) and the superfine fiber-forming fiber ($b_0$) into superfine fibers in this step is carried out by using a solvent or chemical which does not dissolve or decompose the polyester constituting the superfine fiber-forming fiber ($a_0$) and the superfine fiber-forming fiber ($b_0$), but dissolves or decomposes another polymer. When a nonwoven fabric impregnated with the elastomeric polymer (c) is fibrillated, the solvent and chemical are further required not to dissolve and decompose the elastomeric polymer (c). When the flame-retardant component contained in the elastomeric polymer (c) is aluminum hydroxide, the greater part thereof is stably held in the elastomeric polymer (c) without any change because aluminum hydroxide is not dissolved in or decomposed by the solvent or chemical capable of dissolving or decomposing another polymer.

The content of the elastomeric polymer (c) in terms of solid matter in the fibrillated flame-retardant leather-like sheet substrate thus prepared is preferably 10% by mass or more, more preferably 30 to 50% by mass based on the mass of the flame-retardant leather-like sheet substrate. If less than 10% by mass, the dense porous structure of the elastomeric polymer becomes difficult to be formed in the nonwoven fabric. As a result, the flame-retardant component such as aluminum hydroxide tends to fall off and the mechanical properties of the resultant flame-retardant leather-like sheet substrate tends to be reduced.

The entangled nonwoven fabrics ($NWa_0$) and ($NWb_0$) may be laminated by the entangling treatment mentioned above. Alternatively, the lamination may be carried out, after each entangled nonwoven fabric is impregnated with the elastomeric polymer (c) containing the flame-retardant component and fibrillated into superfine fibers, by using an adhesive to produce a flame-retardant leather-like sheet substrate having a layer (A) and a layer (B). An adhesive comprising, as the base ingredient, a polymer of a similar type to the polymer constituting the elastomeric polymer (c) is preferably used to bond the layer (A) and the layer (B), although not specifically limited thereto. For example, when a polyurethane elastomer is used as the elastomeric polymer (c), an urethane-based adhesive is preferably used.

The adhesive may be coated, for example, by a method of coating a solvent dissolving an adhesive resin or by a hot-melt method, although not limited thereto. In view of the feeling and flexibility of the resultant flame-retardant leather-like sheet substrate, the adhesive is preferably coated in a discontinuous manner such as spots and lines rather than coated on the entire surface. For this purpose, a coating method using a gravure roll is preferably employed. In this method, the adhesive is coated in spots with a spot-to-spot distance of 50 to 200 mesh. The coating amount of the adhesive is preferably about 1 to 30 g/m$^2$ as a solid. Even if the adhesive is coated on the entire surface, the reduction in the feeling and the flexibility can be prevented by reducing the coating amount.

In another method, the entangled nonwoven fabrics ($NWa_0$) and ($NWb_0$) may be separately produced, impregnated with the elastomeric polymer (c) containing the flame-retardant component without being laminated upon entanglement, fibrillated into superfine fibers, and finally laminated. This method requires an adhesive bonding step to complicate the process and increase the production costs as compared with the method simultaneously conducting the lamination and the entanglement. However, this method allows the entangled nonwoven fabric ($NWa_0$) and the entangled nonwoven fabric ($NWb_0$) to have polyester superfine fibers of different single fiber finenesses and also allows to be impregnated with the elastomeric polymer (c) containing the flame-retardant component in different contents, thereby providing the flame-retardant leather-like sheet substrate suitable for respective purposes and applications.

When the ratio of the polyester superfine fiber (a) and the flame-retardant polyester; superfine fiber (b), (a)/(b), is 100/0 by mass for the entangled nonwoven fabric ($NWa_0$) and 0/100 by mass for the entangled nonwoven fabric ($NWb_0$), the high tensile properties can be maintained while enhancing the appearance, for example, by making the single fiber fineness relatively smaller for the non-flame-retardant polyester superfine fiber (a) of the layer (A) to form the surface of the artificial leather, and relatively larger for the flame-retardant polyester superfine fiber (b) of the layer (B). The surface strength of the flame-retardant leather-like sheet substrate can be enhanced, for example, by decreasing the content of the flame-retardant component such as aluminum hydroxide for the elastomeric polymer (c) to be impregnated into the layer (A) and by increasing for the elastomeric polymer (c) to be impregnated into the layer (B).

Production Method (2)

Production of Superfine Fiber-Forming Fiber

In the production method (2), the superfine fiber-forming fiber is produced by the same process as in the production method (1) except for the difference in the cross-sectional structure of the superfine fiber-forming fiber. Since the polyester component containing substantially no flame-retardant component and the polyester component containing the flame-retardant component are simultaneously contained in the same superfine fiber-forming fiber, the step for blending different fibers as employed in the production method (1) is not required. However, a fiber being arbitrarily selected may be blended as far as the properties are not adversely affected. The superfine fiber-forming fiber is treated in the same manner as in the production method (1).

The superfine fiber-forming fiber ($e_0$) and the superfine fiber-forming fiber ($f_0$) comprising mix-spun fibers or conjugate-spun fibers of the sea-island type or the multi-layer type may be produced by a conventionally known melt-mix spinning method or melt-conjugate spinning method.

Specifically, the melt-mix spinning method and the melt-conjugate spinning method for producing each superfine fiber-forming fiber are carried out by a sea-island mix- or conjugate-spinning in which a polyester containing no flame-retardant component is used as the island component and a polyester containing the flame-retardant component and another polymer are used as the sea component; a sea-island mix- or conjugate-spinning in which a polyester containing the flame-retardant component is used as the island component and a polyester containing no flame-retardant component and another polymer are used as the sea component; or a multi-layer mix- or conjugate-spinning in which a layer of a polyester containing no flame-retardant component and a layer of a polyester containing the flame-retardant component are bonded to each other via a layer of another polymer. The superfine fiber-forming fiber ($e_0$) thus produced, which has a cross-sectional structure in which a polyester component containing no flame-retardant component is substantially not in contact with a polyester component containing the flame-retardant component and is capable of being converted into the polyester superfine fiber (a) of a single fiber fineness of 0.5 dtex or less containing no flame-retardant component and the flame-retardant polyester superfine fiber (b) of a single fiber fineness of 0.5 dtex or less containing the flame-retardant component in a ratio, (a)/(b), of 100/0 to 40/60 by mass, is then made into staples through a drawing step, a crimping step and a cutting step. The staples are treated in the same manner as in the production method (1) to obtain the entangled nonwoven fabric ($NWe_0$).

Following the same process, the superfine fiber-forming fiber ($f_0$), which has a cross-sectional structure in which a polyester component containing no flame-retardant component is substantially not in contact with a polyester component containing the flame-retardant component and is capable of being converted into the polyester superfine fiber (a) and the flame-retardant polyester superfine fiber (b) in a ratio, (a)/(b), of 70/30 to 0/100 by mass, is produced and made into the entangled nonwoven fabric ($NWf_0$). The entangled nonwoven fabric ($NWe_0$) and the entangled nonwoven fabric ($NWf_0$) may be laminated in the same manner as in the production method (1).

Impregnation of Elastomeric Polymer

The impregnation of the elastomeric polymer (c) is carried out in the same manner as in the production method (1).

Fibrillation into Superfine Fibers

The fibrillation into superfine fibers is also carried out in the same manner as in the production method (1).

The step of impregnating the elastomeric polymer (c) and the step of fibrillating into superfine fibers may be conducted, like the production method (1), in this order or inverse order.

The flame-retardant leather-like sheet substrate of the present invention may be made into a suede artificial leather by a known method of napping the surface of the layer (A). An artificial leather having a short-nap nubuck appearance or a suede-grain intermediate appearance may be obtained by conducting the napping treatment after dissolving or melting the surface of the layer (A) of the flame-retardant leather-like sheet substrate by a solvent or heating, or by conducting such a dissolving or melting treatment after the napping treatment.

The flame-retardant leather-like sheet substrate of the present invention may be made into a grained artificial leather by forming a resin coating on the surface of the layer (A). The formation of coating may be conducted by a known method such as a wet method, a dry method, or a method of embossing the surface of the substrate having been dissolved or melted by a solvent or heating to make it flat or patterned, although not limited thereto.

The resin for the coating is preferably a resin of the same type as the elastomeric polymer (c) constituting the flame-retardant leather-like sheet substrate. For example, when the elastomeric polymer (c) is a polyurethane elastomer, polyurethane is preferably used.

The thickness of the resin coating is preferably about 10 to 300 μm, although not limited thereto. When the thickness exceeds 50 μm, it is preferred to add the flame retardant to the resin coating. Preferred flame retardant to be added include organic or inorganic phosphorus compounds, aluminum hydroxide or other metal hydroxides. These flame retardants may be used alone or in combination of two or more. The content of the flame retardant in the resin coating is preferably, but not limited thereto, 100 parts by mass or less based on 100 parts by mass of the resin in view of the process stability of forming the resin coating and the strength of the resin coating.

The suede artificial leather and the grained artificial leather of the present invention produced as mentioned above are preferably used as the facing materials required to have the flame retardancy and a high surface strength for vehicle seats such as automotive seats, railway coach seats, airplane seats and ship seats, and for the interior furniture such as cushion, seats and chairs. The artificial leather of the present invention may be used as the facing materials for the seats and the interior furniture, if desired, by laminating a reinforcing material such as a woven or knitted fabric to the back surface thereof. It is preferred to make the reinforcing material flame-retardant by a halogen-free flame retardant.

The artificial leather of the present invention may be widely applied to, in addition to the applications mentioned above, clothing, shoes, bags, pouches, gloves and other miscellaneous goods.

The present invention will be explained in more detail by reference to the following example which should not be construed to limit the scope of the present invention. In the following examples and comparative examples, the measurements and the evaluations were made by the following methods.

(i) Single Fiber Fineness (dtex)

Calculated from the fiber diameters measured under about 500 to 2000 magnification electron microscopic observation.

(ii) Average Particle Size of Aluminum Hydroxide

Determined by averaging the diameters of about 100 aluminum hydroxide particles measured by electron microscopic observation.

(iii) Flame Retardancy of Leather-Like Sheet Substrate and Dyed Artificial Leather A leather-like sheet substrate was subjected to a burning test according to JIS D1201 "burning test for interior organic materials for road vehicle" and the flame retardancy was evaluated based on the following ratings. The same evaluation was made on a dyed artificial leather prepared by dyeing a leather-like sheet substrate after buffing in the manner described in "(vi) feeling of suede artificial leather."

Ratings of Flame Retardancy
  highly flammable: fire-spreading speed over 100 mm/min.
  hardly flammable: fire-spreading speed of 100 mm/min or lower.
  self-extinguishing: self-extinguished within 50 mm from the marked line and within 60 s.

(iv) Phosphorus Atom Concentration in Polyester and Leather-Like Sheet Substrate (iv)-1: Phosphorus Atom Concentration in Polyester
  A sample was decomposed and dissolved in a strong acid. The phosphorus atom concentration was measure on the solution using an ICP emission spectrophotometer "IRIS AP" available from Jarrell-Ash Co., Ltd.

(iv)-2: Phosphorus Atom Concentration in Leather-Like Sheet Substrate
  By assuming the phosphorus atom concentration in polyester obtained in (iv)-1 as the phosphorus atom contents of polyester superfine fiber constituting the nonwoven fabrics of the layer (A) and (B), the phosphorus atom concentration based on the total mass of the polyester superfine fiber in the leather-like sheet substrate was calculated while taking the mass ratio of the non-flame-retardant polyester superfine fiber (a) and the flame-retardant polyester superfine fiber (b) into account.

(v) Abrasion Resistance of Leather-Like Sheet Substrate
  The test according to JIS L1096 "abrasion resistance E method (Martindale method)" was conducted using a standard abrasion cloth for 1,000 min under a pressing load of 12 kPa and a rotation speed of 50 rpm to measure the abrasion loss in mass (mg). In addition, the appearance of the leather-like sheet substrate after the abrasion test was visually observed and evaluated based on the following ratings.

Abrasion Resistance Ratings
  5: No abrasion loss and No change in appearance.
  4: Substantially no abrasion loss and substantially no change in appearance.
    3: Slight abrasion loss.
    2: Fair abrasion loss.
    1: Severe abrasion loss.

(vi) Feeling of Suede Artificial Leather
  The buffing surface of dyed suede artificial leathers obtained in the following examples and comparative examples was touched with hand. The smooth suede touch like a natural leather was evaluated as "good," and the touch lacking the smooth suede feeling like a natural leather was evaluated as poor.

PRODUCTION EXAMPLES 1–4

Production of Polyester, Spinning and Production of Staples (1) To terephthalic acid and ethylene glycol, added were 0.04% by mass of titanium dioxide and 500 ppm of antimony trioxide, each based on the mass of terephthalic acid. The mixture was subjected to esterification at 260° C. under 2.0 Pa until the degree of esterification reached 95% or more to prepare a low polymer. A phosphorus-containing flame retardant "M-Ester" available from Sanko Co., Ltd. (molecular weight: 434; phosphorus content: 7% by mass) that was reactive with the low polymer was added in a proportion shown in Table 1. After thoroughly mixing, the mixture was subjected to melt polymerization at 280° C. under a reduced pressure of 40.0 Pa to prepare a prepolymer having an intrinsic viscosity of 0.65 dl/g, which was extruded from a nozzle into a strand and cut into columnar chips. After pre-dried at 120° C. for 2 h, the chips were subjected to solid polymerization at 210° C. for 20 h under a reduced pressure of 13.3 Pa or lower to prepare a polyester having a phosphorus concentration of zero and phosphorus-copolymerized polyesters each having a phosphorus concentration of 3,000 ppm, 8,000 ppm or 12,000 ppm as shown in Table 1.

(2) Using the polyester or the phosphorus-copolymerized polyester for the island component and a high fluidity low-density polyethylene "Mirason FL-60" available from Mitsui Chemicals, Inc. (MFR=70 g/10 min) for the sea component, a sea-island conjugate-spun fiber was produced by a melt-conjugate spinning method at 300° C. (polyester:polyethylene=65:35 by mass; number of islands=50). The sea-island conjugate-spun fiber was drawn 2.5 times in a hot water of 75° C., treated with an oil agent, mechanically crimped, dried, and then cut into staples of 51 mm long having a single fiber fineness of 5.0 dtex.

TABLE 1

| | Production Examples | | | |
|---|---|---|---|---|
| | 1 | 2 | 3 | 4 |
| Materials of Polyester (by mass) | | | | |
| terephthalic acid | 69.1 | 57.7 | 61.6 | 66.3 |
| ethylene glycol | 30.9 | 25.9 | 27.7 | 29.7 |
| P-containing reactive flame retardant | 0 | 16.4 | 10.7 | 4.0 |
| Phosphorus concentration in polyester (ppm) | 0 | 3000 | 8000 | 12000 |

PRODUCTION EXAMPLE 5

By a sea-island melt-conjugate spinning method using a needle pipe nozzle (25 nozzles), was produced a sea-island conjugate-spun fiber having an island component comprising the polyester having a phosphorus atom concentration of zero, and a sea component comprising the phosphorus-copolymerized polyester having a phosphorus atom concentration of 12000 ppm and the above high fluidity low-density polyethylene in a mass ratio of 40/30/30. The fiber thus produced was made into staples having a single fiber fineness of 4.0 dtex in the same manner as mentioned above.

EXAMPLE 1

Production of Flame-Retardant Leather-Like Sheet Substrate and Suede Artificial Leather (1) A web having a mass per unit area of 130 g/m$^2$ was prepared by a known crosslap method under general conditions using the staples of the sea-island conjugate-spun fiber containing, as the island component, the polyester containing no phosphorus atom produced in Production Example 1.

(2) A web having a mass per unit area of 520 g/m² was prepared by a known crosslap method under general conditions using the staples of the sea-island conjugate-spun fiber containing, as the island component, the phosphorus-copolymerized polyester produced in Production Example 3.

(3) The webs prepared in the steps (1) and (2) were stacked to form a laminated web having a mass per unit area of 650 g/m², which was then needle-punched alternatively on its both surfaces at a total pitch of about 2500 punch/cm². After shrunk in a hot water of 90° C., the laminated web was subjected to a dry-tenter treatment at 150° C. for 3 min by stretching the width by 10% of the width before treatment, and then, hot-pressed between calender rolls to prepare an entangled nonwoven fabric having a smooth surface. The mass per unit area was 760 g/m² and the apparent density was 0.48 g/cm³.

(4) To 100 parts by mass of a dimethylformamide (DMF) solution (solid content: 14% by mass) of a polyurethane mainly composed of a polycarbonate-polyurethane "Nippollan 990N" available from Nippon Polyurethane Industry Co. Ltd., was added 17.5 parts by mass of a 40% by mass dispersion of aluminum hydroxide having an average particle size of 1 μm in DMF to prepare an aluminum hydroxide-containing polyurethane liquid (polyurethane:aluminum hydroxide=100:50 by mass).

(5) The nonwoven fabric prepared in the step (3) was immersed in the aluminum hydroxide-containing polyurethane liquid prepared in the step (4). After taken out of the polyurethane liquid, the nonwoven fabric was immersed in a coagulation bath (DMF/water=30/20 by mass) to perform a wet coagulation. After taken out of the coagulation bath, the nonwoven fabric was immersed in a hot toluene of 90° C. to fibrillate into superfine fibers by dissolving away the sea component (polyethylene) of the sea-island conjugate-spun fiber, thereby producing a flame-retardant leather-like sheet substrate of 1.3 mm thick which comprised a layer (A) made of the entangled nonwoven fabric of the non-flame-retardant polyester superfine fiber impregnated with the polyurethane containing aluminum hydroxide, and a layer (B) made of the entangled nonwoven fabric of the flame-retardant polyester superfine fiber impregnated with the polyurethane containing aluminum hydroxide.

The single fiber fineness was 0.2 dtex for both the non-flame-retardant polyester superfine fiber and the flame-retardant polyester superfine fiber each forming the layers (A) and (B) of the flame-retardant leather-like sheet substrate thus prepared. The ratio of the polyester superfine fiber and the polyurethane in the flame-retardant leather-like sheet substrate was about 79:21 by mass. The microscopic observation on the cross section taken along the thickness direction of the flame-retardant leather-like sheet substrate showed that a great part of the aluminum hydroxide particles were retained in the porous polyurethane.

(6) The surface of the layer (A) of the flame-retardant leather-like sheet substrate prepared in the step (5) was buffed so as to have naps of desired long to prepare a suede artificial leather, which was then dyed under the following conditions to prepare a dyed suede artificial leather.

Dyeing Conditions of Suede Artificial Leather

Dye: 3% owf, "Miketon Polyester Blue FBL" available from Mitsui Chemicals, Inc.
Dyeing temperature: 120° C.
Dyeing time: 60 min
Bath ratio: 1:20
Dyeing machine: high-pressure flow dyeing machine "MINI-JET D200" available from Texam Giken Co., Ltd.

(7) The flame retardancy of the flame-retardant leather-like sheet substrate prepared in the step (5) and the suede artificial leather prepared in the step (6); the phosphorus atom concentration and the abrasion resistance of the flame-retardant leather-like sheet substrate prepared in the step (5); and the feeling of the suede artificial leather prepared in the step (6) were measured and evaluated by the methods mentioned above. The results are shown in Table 2.

EXAMPLE 2

Production of Flame-Retardant Leather-Like Sheet Substrate and Suede Artificial Leather (1) Using the staples of the sea-island conjugate-spun fiber containing, as the island component, the polyester containing no phosphorus atom produced in Production Example 1, a web having a mass per unit area of 390 g/m² was prepared in the same manner as in the step (1) of Example 1.

(2) Using the staples of the sea-island conjugate-spun fiber containing, as the island component, the phosphorus-copolymerized polyester produced in Production Example 4, a web having a mass per unit area of 260 g/m² was prepared in the same manner as in the step (2) of Example 1.

(3) Following the same procedure of Example 1, the webs prepared in the steps (1) and (2) were laminated and subjected to the subsequent operations to prepare a nonwoven fabric having a smooth surface (mass per unit area=1,050 g/m²; apparent density=0.45 g/cm³).

(4) Using the nonwoven fabric prepared in the step (3), a flame-retardant leather-like sheet substrate of 1.3 mm thick was produced in the same manner as in the steps (4) and (5) of Example 1.

The single fiber fineness was 0.2 dtex for both the non-flame-retardant polyester superfine fiber and the flame-retardant polyester superfine fiber. The ratio of the polyester superfine fiber and the polyurethane in the flame-retardant leather-like sheet substrate was about 79:21 by mass. The microscopic observation on the cross section taken along the thickness direction of the flame-retardant leather-like sheet substrate showed that a great part of the aluminum hydroxide particles were retained in the porous polyurethane.

(5) The surface of the layer (A) of the flame-retardant leather-like sheet substrate prepared in the step (4) was buffed in the same manner as in the step (6) of Example 1 to prepare a suede artificial leather, which was then dyed in the same manner as in the step (6) of Example 1 to prepare a dyed suede artificial leather.

(6) The flame retardancy, the abrasion resistance and the feeling of the flame-retardant leather-like sheet substrate and the dyed suede artificial leather were measured and evaluated by the methods mentioned above. The results are shown in Table 2.

EXAMPLE 3

Production of Flame-Retardant Leather-Like Sheet Substrate and Suede Artificial Leather (1) Using the staples of the sea-island conjugate-spun fiber containing, as the island component, the polyester containing no phosphorus atom produced in Production Example 1, a web having a mass per unit area of 650 g/m² was prepared by a crosslap method under general conditions. The web was needle-punched alternatively on its both surfaces at a total pitch of about 2500 punch/cm$^2$. After shrunk in a hot water of 90° C., the web was subjected to a dry-tenter treatment and then hot-pressed between calender rolls to prepare an entangled nonwoven fabric having a smooth surface. The mass per unit area was 770 g/m$^2$ and the apparent density was 0.49 g/cm$^3$.

(2) An aluminum hydroxide-containing polyurethane liquid of the same formulation as in the step (4) of Example 1 was prepared.

(3) The nonwoven fabric prepared in the step (1) was immersed in the aluminum hydroxide-containing polyurethane liquid prepared in the step (2), and then subjected to the wet coagulation and the fibrillation into superfine fibers to prepare a sheet substrate of 1.3 mm thick comprising a nonwoven fabric made of a non-flame-retardant polyester superfine fiber impregnated with a polyurethane containing aluminum hydroxide. The sheet substrate was sliced into a thickness of 0.35 mm from the surface thereof, and buffed on the sliced surface to prepare a sheet (A) of 0.26 mm thick.

(4) Using the staples of the sea-island conjugate-spun fiber containing, as the island component, the phosphorus-copolymerized polyester produced in Production Example 3, an entangled nonwoven fabric was prepared in the same manner as in the above step (1). By following the same procedures as in the steps (2) and (3), the entangled nonwoven fabric was made into a sheet (B) (non-buffing sheet) of 1.0 mm thick comprising an entangled nonwoven fabric made of the phosphorus-copolymerized polyester superfine fiber impregnated with the polyurethane containing aluminum hydroxide.

(5) An adhesive prepared by dissolving a polyurethane "Hi-muren NPU-5" (polyether polyurethane) available from Dainichiseika Color & Chemicals Mfg. Co., Ltd. in DMF (solid content: 25% by mass) was coated spot-size on one surface of the sheet (B) prepared in the step (4) by a gravure roll (140 mesh) in a coating amount of 3 g/m$^2$ in terms of solid matter. Immediately after the coating, the sheet (A) prepared in the step (3) was adhesively bonded to the sheet (B) through its buffed surface to prepare a flame-retardant leather-like sheet substrate.

The single fiber fineness was 0.2 dtex for both the non-flame-retardant polyester superfine fiber and the flame-retardant polyester superfine fiber each constituting the sheet (A) (layer (A)) and the sheet (B) (layer (B)) of the flame-retardant leather-like sheet substrate. The ratio of the polyester superfine fibers constituting the layer (A) and the layer (B) of the flame-retardant leather-like sheet substrate was 20:80 as calculated from the mass per unit area.

(6) The surface of the layer (A) of the flame-retardant leather-like sheet substrate thus prepared was buffed in the same manner as in the step (6) of Example 1 to prepare a suede artificial leather, which was then dyed in the same manner as in the step (6) of Example 1 to prepare a dyed suede artificial leather.

(7) The flame retardancy, the abrasion resistance and the feeling of the flame-retardant leather-like sheet substrate and the dyed suede artificial leather were measured and evaluated by the methods mentioned above. The results are shown in Table 2.

EXAMPLE 4

Production of Flame-Retardant Leather-Like Sheet Substrate and Suede Artificial Leather (1) The staples of the sea-island conjugate-spun fiber containing, as the island component, the polyester containing no phosphorus atom produced in Production Example 1 and the staples of the sea-island conjugate-spun fiber containing, as the island component, the phosphorus-copolymerized polyester produced in Production Example 4 were mixed in a blender in a ratio of 50/50 by mass. The mixture was made into a web having a mass per unit area of 650 g/m$^2$. Thereafter, by following the same procedure of Example 1, an entangled nonwoven fabric having a smooth surface was prepared (mass per unit area 1,050 g/m$^2$; apparent density=0.45 g/cm$^3$).

(2) Using the nonwoven fabric prepared in the step (1), a flame-retardant leather-like sheet substrate of 1.3 mm thick was produce in the same manner as in the steps (4) and (5) of Example 1.

The single fiber fineness was 0.2 dtex for both the non-flame-retardant polyester superfine fiber and the flame-retardant polyester superfine fiber. The ratio of the polyester superfine fiber and the polyurethane in the flame-retardant leather-like sheet substrate was about 79:21 by mass. The microscopic observation on the cross section taken along the thickness direction of the flame-retardant leather-like sheet substrate showed that a great part of the aluminum hydroxide particles were retained in the porous polyurethane.

(3) The surface of the layer (A) of the flame-retardant leather-like sheet substrate prepared in the step (2) was buffed in the same manner as in the step (6) of Example 1 to prepare a suede artificial leather, which was then dyed in the same manner as in the step (6) of Example 1 to prepare a dyed suede artificial leather.

(4) The flame retardancy, the abrasion resistance and the feeling of the flame-retardant leather-like sheet substrate and the dyed suede artificial leather were measured and evaluated by the methods mentioned above. The results are shown in Table 2.

EXAMPLE 5

Production of Flame-Retardant Leather-Like Sheet Substrate and Suede Artificial Leather (1) The staples of the sea-island conjugate-spun fiber prepared in Production Example 5 were made into a web having a mass per unit area of 650 g/m$^2$. Thereafter, by following the same procedure of Example 1, an entangled nonwoven fabric having a smooth surface was prepared (mass per unit area 1,050 g/m$^2$; apparent density=0.45 g/cm$^3$).

(2) Using the nonwoven fabric prepared in the step (1), a flame-retardant leather-like sheet substrate of 1.3 mm thick was produce in the same manner as in the steps (4) and (5) of Example 1.

The single fiber fineness was 0.08 dtex for the non-flame-retardant polyester superfine fiber and 0.003 dtex for the flame-retardant polyester superfine fiber. The ratio of the polyester superfine fiber and the polyurethane in the flame-retardant leather-like sheet substrate was about 79:21 by mass. The microscopic observation on the cross section taken along the thickness direction of the flame-retardant leather-like sheet substrate showed that a great part of the aluminum hydroxide particles were retained in the porous polyurethane.

(3) The surface of the layer (A) of the flame-retardant leather-like sheet substrate prepared in the step (2) was buffed in the same manner as in the step (6) of Example 1 to prepare a suede artificial leather, which was then dyed to prepare a dyed suede artificial leather.

(4) The flame retardancy, the abrasion resistance and the feeling of the flame-retardant leather-like sheet substrate and the dyed suede artificial leather were measured and evaluated by the methods mentioned above. The results are shown in Table 2.

COMPARATIVE EXAMPLE 1

Production of Flame-Retardant Leather-Like Sheet Substrate and Suede Artificial Leather (1) Using the staples of the sea-island conjugate-spun fiber containing, as the island component, the phosphorus-copolymerized polyester produced in Production Example 3, a web having a mass per unit area of 650 g/m² was prepared in the same manner as in the step (1) of Example 1.

(2) Using only the web prepared in the step (1), a flame-retardant leather-like sheet substrate of 1.3 mm thick comprising an entangled nonwoven fabric made of the flame-retardant polyester superfine fiber impregnated with a polyurethane containing aluminum hydroxide was prepared by following the same procedures of the steps (3), (4) and (5) of Example 1, i.e., immersion in the aluminum hydroxide-containing polyurethane liquid, coagulation of polyurethane and fibrillation into superfine fibers by dissolving away the sea component (polyethylene) of the sea-island conjugate-spun fiber constituting the nonwoven fabric.

The single fiber fineness of the flame-retardant polyester superfine fiber forming the nonwoven fabric of the flame-retardant leather-like sheet substrate was 0.2 dtex. The ratio of the polyester superfine fiber and the polyurethane in the flame-retardant leather-like sheet substrate was about 79:21 by mass. The microscopic observation on the cross section taken along the thickness direction of the flame-retardant leather-like sheet substrate showed that a great part of the aluminum hydroxide particles were retained in the porous polyurethane.

(3) The surface of the layer (A) of the flame-retardant leather-like sheet substrate prepared in the step (2) was buffed in the same manner as in the step (6) of Example 1 to prepare a suede artificial leather, which was then dyed in the same manner as in the step (6) of Example 1 to prepare a dyed suede artificial leather.

(4) The flame retardancy, the abrasion resistance and the feeling of the flame-retardant leather-like sheet substrate and the dyed suede artificial leather were measured and evaluated by the methods mentioned above. The results are shown in Table 2.

COMPARATIVE EXAMPLE 2

Production of Leather-Like Sheet Substrate and Suede Artificial Leather (1) A web having a mass per unit area of 390 g/m² was prepared by a known crosslap method under general conditions using the staples of the sea-island conjugate-spun fiber containing, as the island component, the polyester containing no phosphorus atom produced in Production Example 1.

(2) A web having a mass per unit area of 260 g/m² was prepared by a known crosslap method under general conditions using the staples of the sea-island conjugate-spun fiber containing, as the island component, the phosphorus-copolymerized polyester produced in Production Example 4.

(3) The webs prepared in the steps (1) and (2) were stacked to form a laminated web having a mass per unit area of 650 g/m². Thereafter, by following the same procedure of Example 1, an entangled nonwoven fabric was prepared (mass per unit area=1,060 g/m²; apparent density 0.45 g/cm³).

(4) By dissolving a polyurethane mainly composed of a polycarbonate-polyurethane "Nippollan 990N" available from Nippon Polyurethane Industry Co. Ltd. in DMF, a polyurethane solution (solid content: 14% by mass) containing no aluminum hydroxide was prepared. The entangled nonwoven fabric prepared in the step (3) was immersed in the polyurethane solution. Thereafter, by following the same procedures of Example 1, a leather-like sheet substrate of 1.3 mm thick was produced.

The single fiber fineness was 0.2 dtex for both the non-flame-retardant polyester superfine fiber and the flame-retardant polyester superfine fiber each forming the leather-like sheet substrate thus prepared. The ratio of the polyester superfine fiber and the polyurethane in the leather-like sheet substrate was about 85:15 by mass. The microscopic observation on the cross section taken along the thickness direction of the leather-like sheet substrate showed that the aluminum hydroxide particles were not retained in the porous polyurethane.

(5) The surface of the layer (A) of the leather-like sheet substrate prepared in the step (4) was buffed in the same manner as in the step (6) of Example 1 to prepare a suede artificial leather, which was then dyed in the same manner as in the step (6) of Example 1 to prepare a dyed suede artificial leather.

(6) The flame retardancy, the abrasion resistance and the feeling of the leather-like sheet substrate and the dyed suede artificial leather were measured and evaluated by the methods mentioned above. The results are shown in Table 2.

TABLE 2

|  | Examples | | | |
|---|---|---|---|---|
|  | 1 | 2 | 3 | 4 |
| Phosphorus atom concentration in superfine fiber (ppm) | | | | |
| polyester superfine fiber of layer (A) | 0 | 0 | 0 | 6000 |
| polyester superfine fiber of layer (B) | 8000 | 12000 | 8000 | 6000 |
| Leather-like sheet substrate | | | | |
| superfine fiber (a)/superfine fiber (b) by mass | 20/80 | 60/40 | 20/80 | 50/50 |
| phosphorus atom concentration (ppm) | 6400 | 4800 | 8000 | 6000 |
| aluminum hydroxide content in polyurethane*¹ | 50 | 50 | 50 | 50 |
| Properties | | | | |
| Flame retardancy | | | | |
| leather-like sheet substrate | *2 | *2 | *2 | *2 |
| dyed suede artificial leather | *2 | *2 | *2 | *2 |
| Abrasion resistance (abrasion loss: mg) | 25 | 32 | 28 | 29 |
| Appearance after abrasion test | 4 | 4 | 4 | 4 |
| Feeling of dyed suede artificial leather | good | good | good | good |

*¹parts by mass of aluminum hydroxide per 100 parts by mass of polyurethane.
*2: self-extinguishing.

|  | Example | Comparative Examples | |
|---|---|---|---|
|  | 5 | 1 | 2 |
| Phosphorus atom concentration in superfine fiber (ppm) | | | |
| polyester superfine fiber of layer (A) | 5140 | 8000 | 0 |
| polyester superfine fiber of layer (B) | 5140 | 8000 | 12000 |
| Leather-like sheet substrate | | | |
| superfine fiber (a)/superfine fiber (b) by mass | 40/30 | 0/100 | 40/60 |
| phosphorus atom concentration (ppm) | 5140 | 8000 | 7200 |

TABLE 2-continued

| | | | |
|---|---|---|---|
| aluminum hydroxide content in polyurethane*[1] | 50 | 50 | 0 |
| Properties | | | |
| Flame retardancy | | | |
| leather-like sheet substrate | *2 | *2 | *3 |
| dyed suede artificial leather | *2 | *2 | *3 |
| Abrasion resistance (abrasion loss: mg) | 27 | 195 | 35 |
| Appearance after abrasion test | 4 | 1 | 4 |
| Feeling of dyed suede artificial leather | good | good | good |

*[1]parts by mass of aluminum hydroxide per 100 parts by mass of polyurethane.
*2: self-extinguishing.
*3: highly flammable.

APPLICATION EXAMPLE 1

Application to Grained Artificial Leather

To a polyurethane mainly composed of a polyurethane prepared by the polymerization of polycarbonate diol, polytetramethylene glycol, polyethylene glycol and 4,4'-dicyclohexylmethane diisocyanate, was added carbon black to prepare a black solution of the polyurethane composition, which was coated on a release paper and dried to form a coating film of 15 μm thick. On the coating film, a mixed solution containing a two-part polyurethane adhesive, a polyisocyanate hardener, an amine catalyst and a solvent was coated in an amount of 20 g/m² in terms of solid matter to form an adhesive layer. Immediately after drying, the adhesive layer still tacky was stacked on the surface of the dyed suede artificial leather and bonded thereto by pressing. After allowed to stand at 60° C. for 48 h, the release paper was removed to prepare a grained artificial leather.

The grained artificial leather thus prepared had a flat and high-quality appearance and a flexible feeling. The result of the test according to JIS D1201 showed that the grained artificial leather was hardly flammable.

APPLICATION EXAMPLE 2

Application to Facing Material for Car Seat

Using the dyed suede artificial leather prepared in Example 1 and the grained artificial leather prepared in Application Example 1 as the facing materials, respective car seats were produced. No problem attributable to the strength occurred during the production and the car seats had a feeling and appearance comparable to natural leathers as well as a flame retardancy required for car seats.

Effects of the Invention

The flame-retardant leather-like sheet substrate and the artificial leather made thereof of the present invention have an extremely excellent flame retardancy, a soft and high-quality feeling and appearance, a high abrasion resistance and peel strength, and excellent mechanical properties such as surface strength. In particular, when the flame-retardant polyester superfine fiber for constituting the nonwoven fabric of the layer (B) is made of a halogen-free phosphorus-copolymerized polyester and the flame-retardant component contained in the elastomeric polymer to be impregnated into the nonwoven fabric for constituting the flame-retardant leather-like sheet substrate is a non-halogen flame retardant, particularly, aluminum hydroxide, the flame-retardant leather-like sheet substrate and the artificial leather made thereof of the present invention are also excellent in the safety in addition to the above excellent properties because no halogen harmful to environment is contained.

With the excellent properties mentioned above, the flame-retardant leather-like sheet substrate and the artificial leather made thereof of the present invention are useful particularly as the facing materials for vehicle seats such as railway coach seats, automotive seats, airplane seats and ship seats, and for the interior furniture such as sofas, cushions and chairs, which are required to have a high flame retardancy and safety, a good feeling and appearance, and a high surface strength. In addition to the above use, the flame-retardant leather-like sheet substrate and the artificial leather made thereof can be effectively used in wide applications such as clothing, shoes, bags, pouches, gloves and other miscellaneous goods.

What is claimed is:

1. A flame-retardant leather-like sheet substrate, which comprises;
   (A) a layer of an entangled nonwoven fabric comprising a polyester superfine fiber (a) of a single fiber fineness of 0.5 dtex or less containing no flame-retardant component and a flame-retardant polyester superfine fiber (b) of a single fiber fineness of 0.5 dtex or less containing a flame-retardant component in a ratio, (a)/(b), of 100/0 to 40/60 by mass, the entangled nonwoven fabric containing in its inside an elastomeric polymer (c) containing a flame-retardant component; and
   (B) a layer of an entangled nonwoven fabric comprising the polyester superfine fiber (a) and the flame-retardant polyester superfine fiber (b) in a ratio, (a)/(b), of 70/30 to 0/100 by mass, the entangled nonwoven fabric containing in its inside the elastomeric polymer (c) containing the flame-retardant component,
   the ratio of the total polyester superfine fiber (a) and the total flame-retardant polyester superfine fiber (b) in the flame-retardant leather-like sheet substrate being 10:90 to 90:10 by mass.

2. The flame-retardant leather-like sheet substrate according to claim 1, wherein a tensile strength of the polyester superfine fiber (a) is 1.6 g/dtex or more.

3. The flame-retardant leather-like sheet substrate according to claim 1, wherein the flame-retardant polyester superfine fiber (b) comprises a copolyester that is copolymerized with a phosphorus-containing compound.

4. The flame-retardant leather-like sheet substrate according to claim 3, wherein a phosphorus atom concentration in the copolyester is 6,000 to 50,000 ppm.

5. The flame-retardant leather-like sheet substrate according to claim 3, wherein a phosphorus atom concentration is 3,000 to 20,000 ppm based on a total mass of the polyester superfine fiber (a) and the flame-retardant polyester superfine fiber (b).

6. The flame-retardant leather-like sheet substrate according to claim 1, wherein the flame-retardant component to be contained in the elastomeric polymer (c) is aluminum hydroxide.

7. The flame-retardant leather-like sheet substrate according to claim 6, wherein a content of total aluminum hydroxide is 10 to 200 parts by mass based on 100 parts by mass of the elastomeric polymer (c).

8. A method of producing a flame-retardant leather-like sheet substrate, comprising:
- (I) a step of producing an entangled nonwoven fabric ($NWa_0$) comprising a superfine fiber-forming fiber ($a_0$) capable of forming a polyester superfine fiber (a) of a single fiber fineness of 0.5 dtex or less containing no flame-retardant component and a superfine fiber-forming fiber ($b_0$) capable of forming a flame-retardant polyester superfine fiber (b) of a single fiber fineness of 0.5 dtex or less containing a flame-retardant component in a ratio that provides the polyester superfine fiber (a) and the flame-retardant polyester superfine fiber (b) in a ratio, (a)/(b), of 100/0 to 40/60 by mass; and producing an entangled nonwoven fabric ($NWb_0$) comprising the superfine fiber-forming fiber ($a_0$) and the superfine fiber-forming fiber ($b_0$) in a ratio that provides the polyester superfine fiber (a) and the flame-retardant polyester superfine fiber (b) in a ratio, (a)/(b), of 70/30 to 0/100;
- (II) a step of laminating the entangled nonwoven fabric ($NWa_0$) and the entangled nonwoven fabric ($NWb_0$);
- (III) a step of impregnating the entangled nonwoven fabric ($NWa_0$) and the entangled nonwoven fabric ($NWb_0$) with an elastomeric polymer (c) containing the flame-retardant component; and
- (IV) a step of converting the superfine fiber-forming fiber ($a_0$) and the superfine fiber-forming fiber ($b_0$) respectively into the polyester superfine fiber (a) and the flame-retardant polyester superfine fiber (b).

9. The flame-retardant leather-like sheet substrate according to claim 1, which is made into a form of a suede artificial leather.

10. The flame-retardant leather-like sheet substrate according to claim 1, which is made into a form of a grained artificial leather.

11. The flame-retardant leather-like sheet substrate according to claim 1, which is made into a form of a facing material for chairs and vehicle seats.

12. The flame-retardant leather-like sheet substrate according to claim 1, wherein the flame-retardant polyester superfine fiber (b) is a copolyester comprising copolymerized monomer units of a phosphorous-containing monomer.

13. The flame-retardant leather-like sheet substrate according to claim 12, wherein the phosphorous-containing monomer unit is at least one selected from the group consisting of oxaphosphorane, a phosphinic acid, a phosphaphenanthrene and a phosphoric triester.

14. The flame-retardant leather-like sheet substrate according to claim 12, wherein the copolyester comprises copolymerized units of 9,10-dihydro-9-oxa-10-phosphaphenanthrene-10-oxide.

15. The flame-retardant leather-like sheet substrate according to claim 12, wherein the copolymerized phosphorous-containing monomer unit is present in a side chain of the copolyester.

16. The flame-retardant leather-like sheet substrate according to claim 12, wherein the copolyester is free of halogen and the concentration of phosphorous atom in each of layers (A) and (B) is 4,500 ppm or more based on the total mass of the non-flame-retardant polyester superfine fiber (a) and the flame-retardant polyester superfine fiber (b).

17. The flame-retardant leather-like sheet substrate according to claim 1, wherein the elastomeric polymer (c) is at least one selected from the group consistent of a polyurethane elastomer, a polyester thermoplastic elastomer, a polyamide thermoplastic elastomer, an elastic hydrogenated product of a styrene-isoprene block copolymer, an acrylic rubber, a natural rubber, SBR, NBR, polychloroprene, polyisoprene, and an isobutylene-isoprene rubber.

18. The flame-retardant leather-like sheet substrate according to claim 1, wherein the elastomeric polymer (c) is a polyurethane elastomer.

19. The flame-retardant leather-like sheet substrate according to claim 1, wherein the substrate has an abrasion loss measured according to JIS L 1096 under a pressing load of 12 kPa and a rotation speed of 50 rpm of 32 mg or less.

20. The flame-retardant leather-like sheet substrate according to claim 1, wherein substrate has an abrasion loss measured according to JIS L 1096 under a pressing load of 12 kPa and a rotation speed of 50 rpm of 25 mg or less.

* * * * *